Aug. 12, 1941.   O. B. BJORGE   2,252,247
BAND BRAKE
Filed March 16, 1940
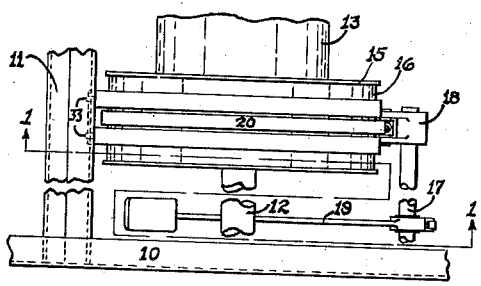
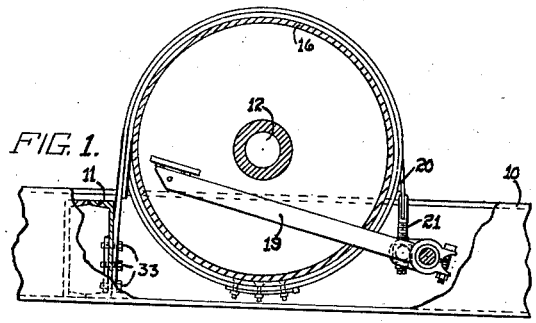
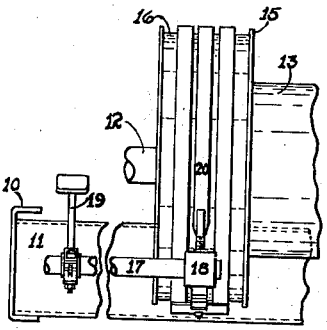
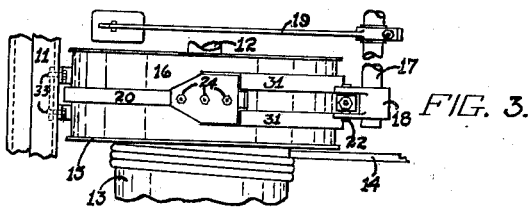
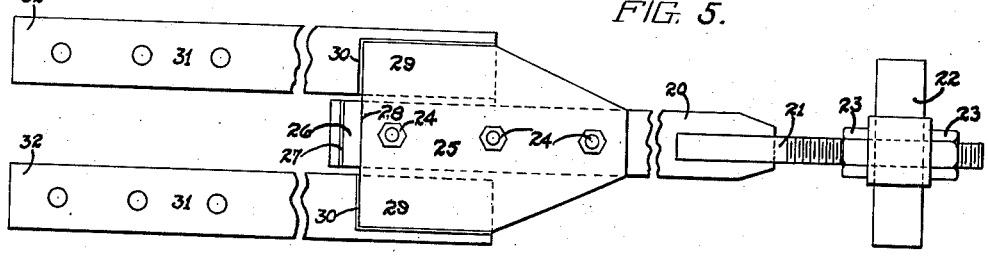
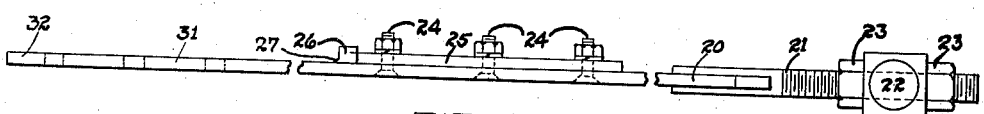
INVENTOR
OSCAR B. BJORGE
BY
ATTORNEY Patented Aug. 12, 1941

2,252,247

UNITED STATES PATENT OFFICE 2,252,247

BAND BRAKE

Oscar B. Bjorge, Portland, Oreg.

Application March 16, 1940, Serial No. 324,332

1 Claim. (Cl. 188—77)

This invention relates generally to hoisting or cable winding machinery, and particularly to band brakes for use in connection therewith.

The main object of this invention is to construct a band brake by means of which the arc of contact can be easily increased from 270 degrees to 540 degrees or more.

The second object is to provide a band brake especially adapted for use on what are known as loading donkeys or hoists by means of which heavy logs are picked up and placed upon railroad cars or trucks requiring that the lowering of the logs be performed without undue violence.

The third object is to construct a brake of the class described and for the purpose set forth in a manner to prolong the life of the equipment, safeguard the lives and persons of its operators and to reduce the amount of physical effort required to satisfactorily lower a log upon a truck or car.

The fourth object is to so apply the band brake that the wearing action will be exceedingly uniform throughout the entire area of contact.

These and other objects are accomplished in the manner set forth in the following specification as illustrated in the accompanying drawing, in which:

Fig. 1 is a fragmentary side elevation of a cable winding mechanism showing a portion thereof broken away in section along the line I—I in Fig. 2.

Fig. 2 is a fragmentary plan of Fig. 1.

Fig. 3 is a fragmentary bottom view of Fig. 1.

Fig. 4 is a fragmentary end elevation of Fig. 1.

Fig. 5 is an enlarged detail of the brake band and the connecting fittings.

Fig. 6 is a side elevation of Fig. 5.

Similar numerals refer to similar parts throughout the several views.

Referring in detail to the drawing, there is shown the side frames 10 which are spaced by the cross members 11. Across the frames 10 is mounted the transverse drum shaft 12 upon which is mounted a cable winding drum 13 upon which is wound a supply of cable 14.

On the cable drum flange 15 is formed a brake drum 16 which is shown with excessive breadth for the purposes of illustration. There is also shown a brake lever shaft 17 which is supported in any convenient manner not shown. On the brake shaft 17 is secured the brake rocker 18 and also a brake foot lever 19 by means of which the engineer applies the braking action.

The mechanism thus far described is common to numerous forms of cable winding mechanisms now in use.

Referring particularly to my invention, same will be seen to consist of a central brake band 20 whose threaded end 21 passes through the wrist pin 22 which forms a part of the brake rocker 18. The threaded portion 21 is held in place by means of the nuts 23.

Attached to the central brake band 20 by means of the bolts 24 is a gusset plate 25. A shear lug 26 is secured to the band 20 by means of a weld 27. The lug 26 engages the end 28 of the gusset plate 25. To the portions 29 of the gusset plate 25 are secured by means of welds 30 the lateral brake bands 31. The ends 32 of the bands 31 are secured to the cross ties 11 by means of the bolts 33.

It will be noted that the bands 20 and 31 are wrapped completely around the drum 16 and in addition thereto extend beyond the complete circumference to approximately 540 degrees of the contact circle in the form illustrated. Obviously, this amount can be increased further by relocating the brake shaft 17.

The operation of this form of the device is identical with that of other band brakes except that far less manual effort and movement are required for a given application than is the case with the ordinary brake band which contacts only 270 degrees of the drum circle while unequally distributing the braking area about this partial circumference of the drum 16.

While with the ordinary form of brake band the braking action is brought about by a direct pressure applied from the band to the drum, in my device the bands 20 and 31 are wrapped around the drum 16 thereby greatly increasing the braking action and uniformly distributing same along the entire braking area giving the operator a more desirable control over the load with far less effort than is ordinarily required by existing mechanisms.

While in some cases it might be desirable to form the members 20 and 31 out of one piece, it will in most cases be found preferable to construct same somewhat after the fashion illustrated herein.

I claim:

In a band brake of the class described, a pair of brake bands adapted to partially encircle a brake drum and to be secured at one pair of ends to an anchor, and having a gusset plate uniting the opposite ends of the bands, and holding same in spaced relationship, a central band removably attached to said gusset plate having a shear lug thereon adapted to engage said gusset plate, and a brake applying means attached to said central band, said band brake being characterized by having its friction surface completely encircling the drum and having means for separating the joint ends of said bands for construction and assembling purposes.

OSCAR B. BJORGE.